No. 607,304.  
E. WAGNER.  
BEER PASTEURIZING APPARATUS.  
(Application filed Jan. 3, 1898.)  
Patented July 12, 1898.
(No Model.)
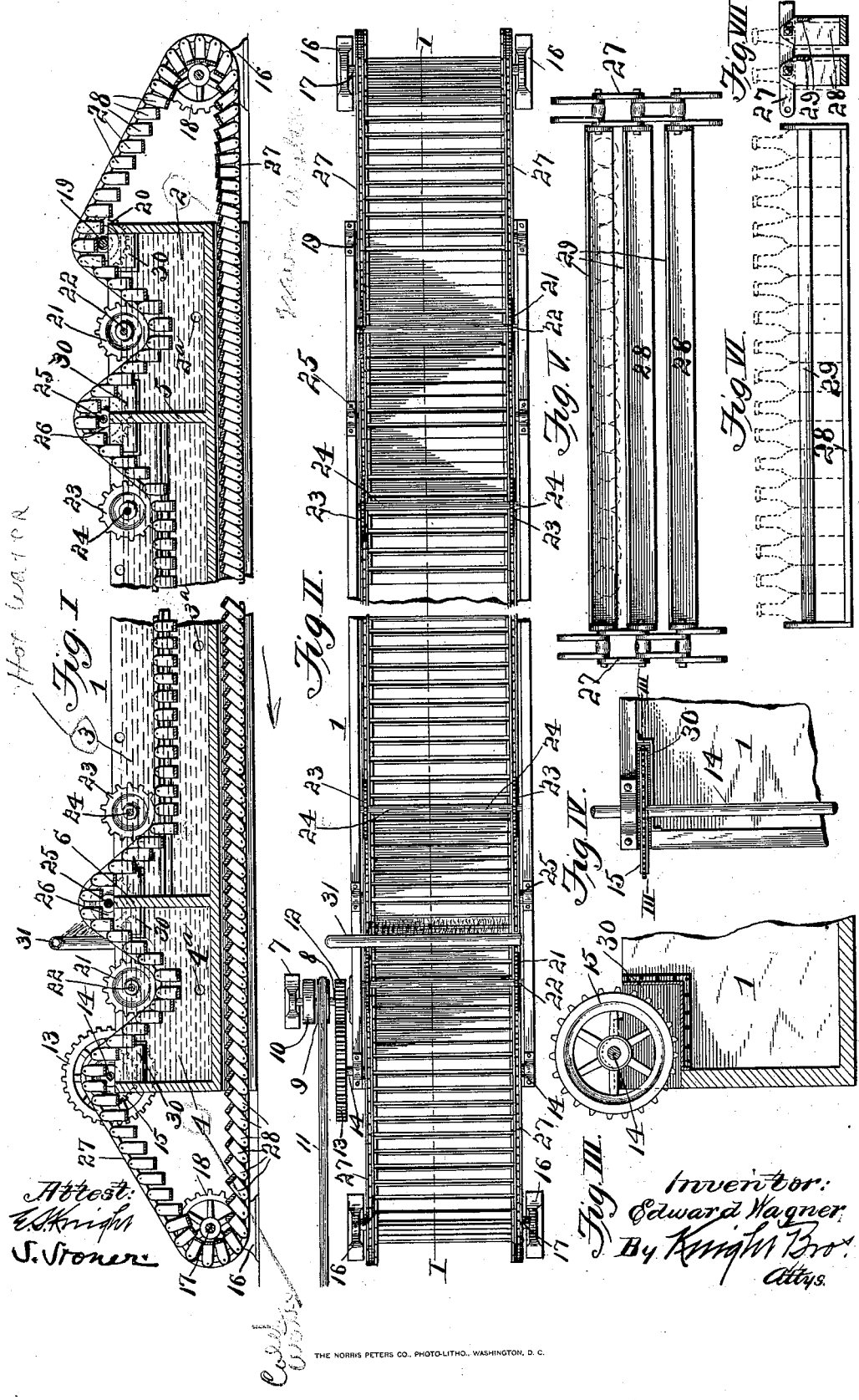
Inventor:
Edward Wagner
By Knight Bro*
Attys.
Attest:
E. S. Knight
J. Stoner

UNITED STATES PATENT OFFICE.

EDWARD WAGNER, OF ST. LOUIS, MISSOURI.

BEER-PASTEURIZING APPARATUS.

SPECIFICATION forming part of Letters Patent No. 607,304, dated July 12, 1898.

Application filed January 3, 1898. Serial No. 665,350. (No model.)

*To all whom it may concern:*

Be it known that I, EDWARD WAGNER, a citizen of the United States, residing at the city of St. Louis, in the State of Missouri, have invented certain new and useful Improvements in Beer-Pasteurizing Apparatuses, of which the following is a full, clear, and exact description, reference being had to the accompanying drawings, forming part of this specification.

My invention relates to that character of apparatus in which bottled beer is treated to the action of hot water to destroy the life of yeast molecules and germs contained in the beer, whereby further fermentation is prevented.

My invention consists in features of novelty hereinafter fully described, and pointed out in the claims.

Figure I illustrates a vertical longitudinal section taken on line I I through the apparatus. Fig. II is a top or plan view of the apparatus. Fig. III is a sectional view taken on the line III III, Fig. IV. Fig. IV is a detail top view of one of the corners of the apparatus, showing one of the chain-receiving sprocket-wheels and the pocket in which it turns. Fig. V is a top view of a portion of the conveyer. Fig. VI is a side view of one of the bottle-receiving receptacles. Fig. VII is a detail view of a portion of one of the conveyer-chains and shows a cross-section of two of the bottle-receiving receptacles.

1 designates a tank which is preferably divided into three compartments 2, 3, and 4, into which water is fed by inlets $2^a$, $3^a$, and $4^a$ and overflow-outlets. The compartment 2 is separated from the compartment 3 by a partition 5, and the compartment 4 is separated from the compartment 3 by a partition 6.

The compartment 2 is designed to receive warm water, the compartment 3 hot water, and the compartment 4 cold water, and in the operation of the apparatus the bottles containing the beer are conveyed in the manner to be hereinafter described, first through the warm-water compartment, where they are slightly heated, then through the hot-water compartment, where the pasteurization of the beer is accomplished, and finally through the cold-water compartment to cool the bottles.

7 designates a standard located at one side of the tank, and 8 the driving-shaft for the conveyer, mounted in said standard, the inner end of which is mounted in the adjoining side of the tank. On the shaft 8 are tight and loose pulleys 9 and 10, that receive a driving-belt 11.

12 designates a spur-wheel on the shaft 8, the teeth of which mesh with the teeth of a spur-wheel 13, mounted on a shaft 14, that is journaled in boxes on the tank 1. This shaft 14 extends from side to side of the tank and bears a pair of sprocket-wheels 15, located interior of the walls of the tank.

16 designates standards exterior of the tank 1 and located short distances from the ends of the tank. These standards are arranged in pairs, each pair receiving a shaft carrying a pair of sprocket-wheels 18, located in proximity to the standards.

At the opposite end of the tank to that where the driving mechanism is located is a shaft 19, that carries a pair of sprocket-wheels 20.

In each of the compartments 2 and 4 of the tank is a pair of sprocket-wheels 21, carried by shafts 22, mounted in the side walls of the tank.

23 designates sprocket-wheels carried by shafts 24, mounted in the side walls of the tank and within the central compartment 3.

Approximately in line with the division-partitions 5 and 6 are shafts 25, mounted in the side walls of the tank, that carry pairs of sprocket-wheels 26.

27 designates endless chains that travel in engagement with the various sprocket-wheels described, the course of such chains being over some of the sprocket-wheels and under some of them, as will hereinafter appear.

28 designates bottle-receptacles pivotally connected to the chains 27 at frequent intervals and preferably to the pins that join each link of the chains to the adjoining link. The receptacles are of U shape, the inturned ends receiving the pins by which the receptacles are connected to the chains. At one side of each receptacle is a bar 29, such bars being arranged at a corresponding side of each receptacle, so that in each instance a pocket is formed for the bottles, inasmuch as the bottles in any one of the receptacles rest between the inner face of the bar 29 of the receptacle in which they are contained and the outer face of the bar 29 on the next adjoining receptacle. The position the bottles assume in the receptacles is illustrated in Figs. V, VI, and VII.

In order to avoid arranging the sprocket-wheels 15, 19, and 25 at an elevation and thus cause the conveyer to travel a considerable distance upwardly out of the tank, I form openings in the end walls of the tank and the partitions 5 and 6. These openings I close by means of pockets 30, in which the sprocket-wheels operate, the pockets preventing the water from flowing from the tank or the water of varying temperatures in the different compartments from mixing.

For the purpose of gradually cooling the bottles and the beer contained by them I provide a spray-pipe 31, from which a spray of cold water is directed upon the bottles as they leave the hot-water compartment and before they enter the succeeding compartment, in which they are immersed in cold water.

In the operation of the apparatus the bottles containing the beer to be pasteurized are fed into the receptacles 28 at one end of the machine, and the conveyer, receiving motion from the driving mechanism, conveys them through the tank. The conveyer is intended to travel at a slow speed, and the bottles first entering the compartment 2 are thoroughly warmed by the warm water in such compartments. In traveling through the next succeeding compartment containing hot water the yeast molecules contained in the beer are destroyed by the action of the heat, as are also any germs that may be present in the beer. From the hot-water compartment the conveyer carries the bottles next into the cold-water compartment 4 for the purpose of cooling them; but before they enter the cold water they receive a spray of water from the spray-pipe 31, that causes their temperature to be gradually lowered, so that they will not be broken by entering the cold water while still hot from the effect of the hot water. When the bottles leave the compartment 4, the pasteurization of the beer is completed, and the bottles are removed from the receptacles by an attendant stationed at that end of the apparatus.

While I have described the apparatus for use in pasteurizing beer, I wish it understood that I do not limit myself to its use for this purpose. Another use to which I desire to put it is to the soaking of empty bottles in cleansing them. It is well adapted to this use, and in such use the partitions 5 and 6 may be employed, or, if desired, such partitions may be omitted and the tank therefore contain but a single compartment.

I claim as my invention—

1. In an apparatus of the character described, the combination of a tank, a pair of endless chains, sprocket-wheels in engagement with which said chains are adapted to travel, bottle-receiving receptacles pivoted to said chains, and means for driving said chains, substantially as described.

2. In an apparatus of the character described, the combination of a tank, a pair of endless chains, sprocket-wheels in engagement with which said chains are adapted to travel, bottle-receiving receptacles pivoted to said chains, said receptacles comprising U-shaped bars and cross-bars arranged on corresponding sides of said U-shaped bars, and means for driving said chains, substantially as described.

3. In an apparatus of the character described, the combination of a tank divided into three compartments for warm, hot and cold water, a conveyer arranged to travel through said compartments, said conveyer comprising a pair of endless chains, and bottle-receiving receptacles pivoted to said chains, sprocket-wheels in engagement with which said chains are adapted to travel, means for driving said chains, and a spray-pipe arranged to direct a spray of water onto the bottles in the conveyer after they leave the hot-water compartment of said tank, substantially as described.

EDWARD WAGNER.

In presence of—
E. S. KNIGHT,
N. V. ALEXANDER.